United States Patent [19] [11] 3,881,887
McMaster [45] May 6, 1975

[54] APPARATUS AND METHOD FOR GRINDING AN ELONGATED WORKPIECE

[76] Inventor: Harold A. McMaster, 707 Riverside Dr., Woodville, Ohio 43469

[22] Filed: Apr. 1, 1974

[21] Appl. No.: 456,915

Related U.S. Application Data

[63] Continuation-in-part of Ser. No. 426,389, Dec. 19, 1973, abandoned.

[52] U.S. Cl. ................. 51/49; 51/103 C; 51/105 R; 51/131; 51/289 R
[51] Int. Cl. ............................................. B24b 5/04
[58] Field of Search ...... 51/74 R, 49, 50 R, 95 WH, 51/100 R, 103 C, 105 R, 123, 131, 289 R

[56] References Cited
UNITED STATES PATENTS

| 1,831,085 | 11/1931 | Williams | 51/101 R |
| 2,127,210 | 8/1938 | Dunbar | 51/95 WH |
| 2,142,710 | 1/1939 | Bigelow | 51/50 R |
| 2,660,840 | 12/1953 | Bergstrom | 51/131 |
| 2,819,572 | 1/1958 | Lewis | 51/289 R |
| 3,481,319 | 12/1969 | Boyd et al. | 51/131 X |

Primary Examiner—Donald G. Kelly
Assistant Examiner—K. J. Ramsey
Attorney, Agent, or Firm—Reising, Ethington & Perry

[57] ABSTRACT

An apparatus and method for grinding a workpiece in the form of an elongated, cylindrical roll from a rough diameter to a finish diameter throughout the length of the roll. The apparatus includes support means for rotatably supporting the workpiece, and rotatable grinding means supported for movement in a path parallel to the axis of rotation of the workpiece. The grinding means includes a rough-cutting grinding surface engageable with the workpiece in an undercutting relationship so that the rough-cutting operation imposes forces on the workpiece in a substantial axial direction only. The grinding means also includes a finish-cutting grinding surface trailing the rough-cutting grinding surface and operable to finish cut the workpiece to its finish diameter. The apparatus may include support means for supporting a workpiece at its ends with friction drive means for rotating the workpiece.

24 Claims, 6 Drawing Figures

PATENTED MAY 6 1975 3,881,887

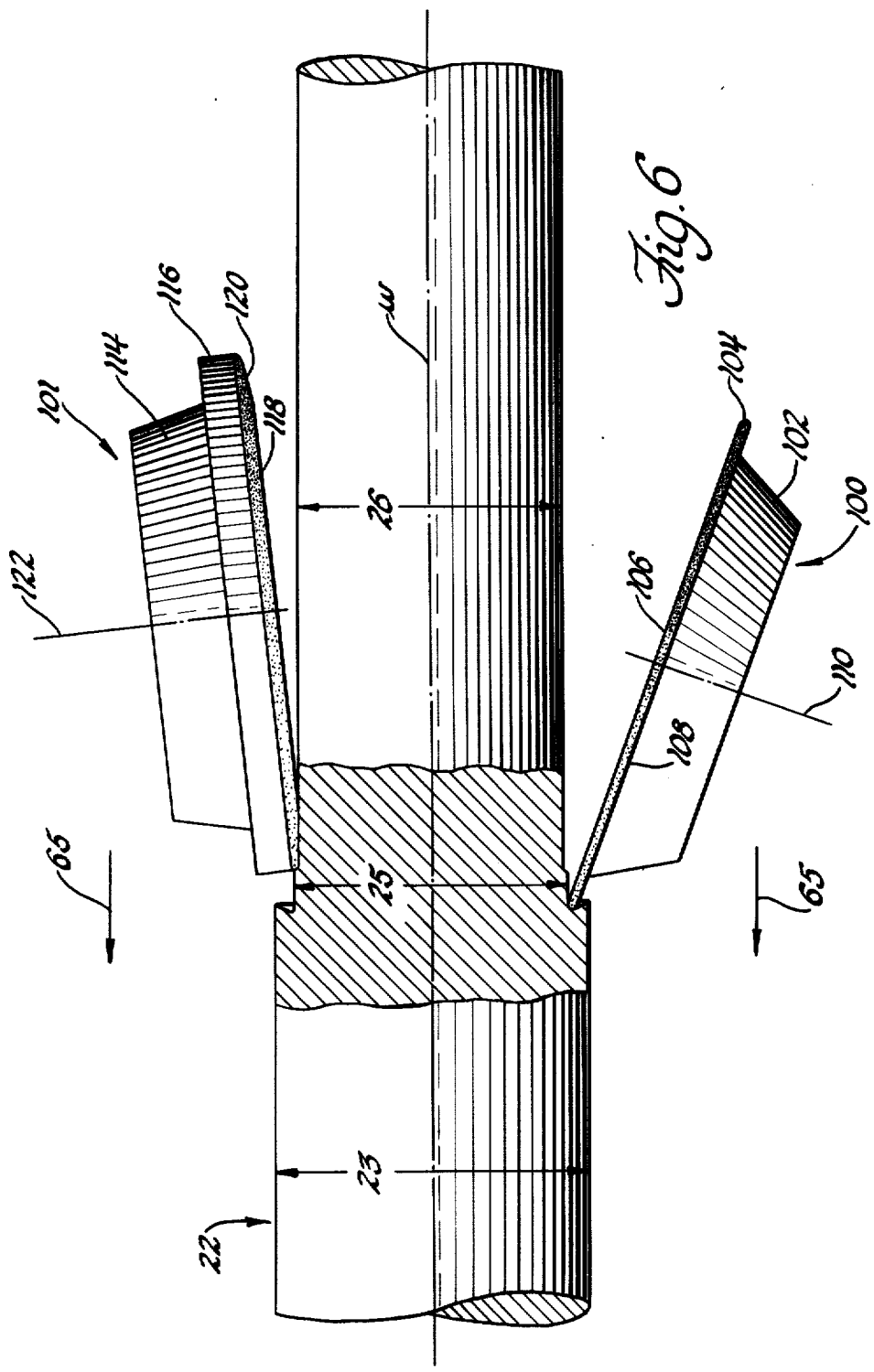

APPARATUS AND METHOD FOR GRINDING AN ELONGATED WORKPIECE

This application is a continuation-in-part of application Ser. No. 426,389 filed Dec. 19, 1973, now abandoned.

This invention relates generally to the grinding art, and is particularly concerned with an apparatus and method for grinding a workpiece in the form of an elongated, cylindrical roll.

U.S. Pat. application Ser. No. 244,542 of McMaster and Nitschke, filed Apr. 17, 1972, and entitled "Roller Hearth Furnace", now U.S. Pat. No. 3,806,312, discloses a furnace used in the glass making art. In the apparatus disclosed in the latter application, a large number of rolls of ceramic material are used to transport sheets of glass through a furnace, the rolls resting on a moving belt which causes the rolls to rotate about their own axes to transport sheets of glass or the like through a furnace or other treatment zone. The rolls are formed of ceramic material such as fused silica, or glass rock, to a rough diameter, and then must be ground to a finish diameter before installation into the furnace.

The conventional method of grinding rolls of this general configuration is to engage the roll to be ground with a grinding wheel whose axis is disposed substantially parallel to the axis of the roll. The grinding wheel generally has a relatively wide perimeter with abrasive material thereon for removing stock from the roll, as the roll is rotated about its theoretical longitudinal axis. Considerable transverse force is necessary to cause the abrasive edge of the grinding wheel to penetrate into the roll before the grinding and stock removal begins. The transverse force tends to deflect the roll in proportion to the varying depth of cut which results in considerable amount of run out causing scrapping of warped or malformed rolls.

Furthermore, when the roll to be ground is mounted in a conventional chuck between lathe centers, the material of the roll, and its elongated configuration, is such that the roll undergoes considerable bending and additional distortion as it is driven by the lathe chuck jaws.

An object of this invention is to provide a method and apparatus for grinding a workpiece in the form of an elongated cylindrical roll in such a manner that the tendency for the workpiece to be warped and distorted by the grinding wheel during the grinding operation is minimized.

A more specific object of this invention is to provide a method and apparatus for grinding a workpiece in the form of an elongated, cylindrical roll in such a manner that the transverse or radial forces on the roll during grinding are substantially eliminated to minimize the tendency to warp the roll during the grinding operation.

A still further object of this invention is to provide apparatus for supporting a workpiece in the form of an elongated, cylindrical roll for grinding the roll in such a manner that the roll is frictionally rotated about its theoretical longitudinal axis for the grinding operation so that any tendency for the roll to be bent about its longitudinal axis is substantially eliminated.

The foregoing, and other objects, are achieved in accordance with the present invention by the provision of apparatus including support means for rotatably supporting an elongated, cylindrical workpiece at its ends, and rotatably grinding means movable in a path parallel to the axis of rotation of the workpiece. The grinding means includes a rough-cutting grinding surface engageable with the workpiece in an undercutting relationship in such a manner that substantially axial forces only are imparted on the workpiece. The grinding means further includes a finish-cutting grinding surface trailing the rough cutting grinding surface and operable to finish cut the workpiece to its finish diameter.

In one embodiment, the grinding means is in the form of a grinding wheel having a substantially V-shaped peripheral grinding edge having two grinding surfces extending from the apex at an acute angle with respect to each other. The grinding wheel, during the grinding operation, lies in a plane disposed at an acute angle with respect to the axis of rotation of the support means on which the workpiece is supported such that one surface of the grinding surface is substantially parallel to the axis of rotation and the other grinding surface is disposed at an acute angle with respect to the axis of rotation. The grinding wheel is movable during rotation about its own axis in a direction parallel to the axis of rotation of the workpiece such that with the apex of the grinding edge located with respect to the axis of rotation at the finish diameter of the workpiece, the other grinding surface can remove stock from the workpiece with an undercut, the first grinding surface trailing the apex and finish grinding the workpiece to the finish diameter. With the stock being removed with an undercutting operation, the adverse radial forces on the elongated roll are substantially eliminated, and the roll is pulled by the undercutting operation into the first grinding surface for smoothing so that stock is removed quickly with a substantially simultaneous rough cut and finish operation.

In another embodiment, the rotatable grinding means includes two grinding wheels located on opposite sides of the axis of rotation of the workpiece. One of the grinding wheels has a peripheral grinding edge that engages the workpiece with an undercut and rough cuts the workpiece as it moves along the length of the workpiece and imposes axial forces only on the workpiece. The other grinding wheel has a finish-cutting grinding surface that trails the rough grinding wheel and engages the workpiece to finish-cut the workpiece to its finish diameter.

The invention further includes a friction drive arrangement for supporting the workpiece at its ends. The drive means includes a head portion and a shank portion, with the shank portion being received in an opening at the ends of the workpiece engaged with the surface of the opening by an O-ring. An O-ring is also located between the head portion of the drive member and the end surface of the workpiece for frictionally imparting rotation between the drive member and roll. One of the drive members is secured nonrotatably to the chuck of the lathe, and the other is recessed to receive a lathe center so that the roll is drivingly supported at the chucked end, the O-ring drive permitting frictional slippage to prevent bending of the roll.

Other objects, advantages and features of the invention will become apparent from the following description taken in connection with the accompanying drawings in which:

FIG. 6 is a view similar to FIG. 3 illustrating another embodiment of the invention.

Figure 1:
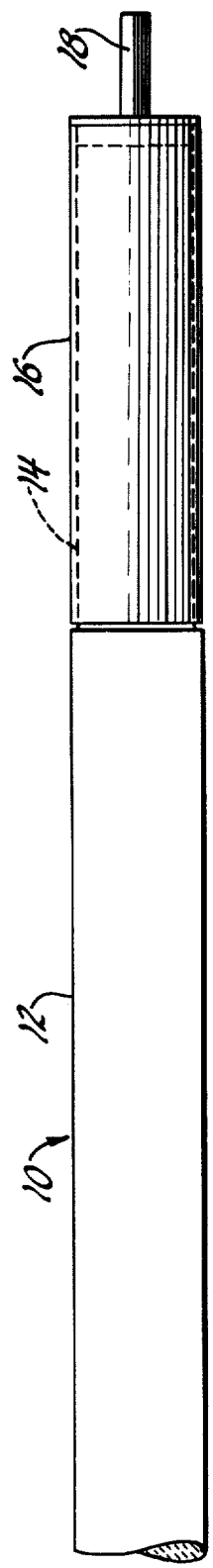
FIG. 1 is a fragmentary view of a roll in its finished form of the type that is ground according to the method and apparatus of the invention.

In FIG. 1, reference numeral 10 collectively designates a portion of a ceramic roll for use in a roller hearth furnace of the type disclosed in the aforementioned U.S. application Ser. No. 244,542 of McMaster, et al. The latter application discloses a furnace of the type for heating sheet glass. A pair of spaced parallel rows of ceramic blocks are disposed in end to end relationship and extend through the furnace. A pair of metal endless loop belts are entrained about wheels disposed exteriorly of the furnace with the upper reach of each belt disposed upon and movable along the upper planar surface of the rows of ceramic blocks. A plurality of ceramic rollers rest upon and extend between the belts with their ends received in brackets for preventing the rollers from moving longitudinally relative to the furnace. Movement of the belts causes the rollers to rotate to in turn move sheets of glass through the furnace.

Figure 2:
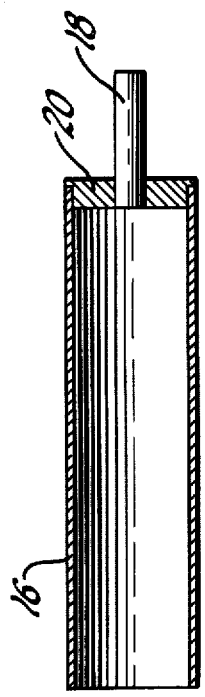
FIG. 2 is a sectional view of the end cap of the roll of FIG. 1.

In FIG. 1, reference numeral 10 collectively designates one roller construction suitable for use in the furnace of the aforementioned McMaster, et al. application Ser. No. 224,542. The roller 10 includes an elongated, cylindrical roll 12 of ceramic material having a reduced diameter portion 14 at its end for receiving a cylindrical tubular, metal cap 16. A pin 18 projects outwardly from the end of the cap 16. As shown in FIG. 2, the cap 16 is in the form of a segment of a metal tube having a plug or endplate 20 secured to and closing one end of the tube, with the pin 18 mounted in the endplate 20 along the longitudinal axis of the tubular cap 16.

In the type of roller hearth furnace disclosed in the aforementioned McMaster, et al. application, the end cap 16 at each end of the roller 10 may rest upon drive belts with the pins 18 received in slots of support brackets to prevent the roller from advancing with the belts. The movement of the belts beneath the end cap 16 causes the rollers 10 to rotate about their longitudinal axes. The ceramic roll 12 between the end caps 16 spans the gap between the belts into the furnace, and support sheets of glass which are conveyed through the furnace by the rotating rolls 12. The specific details of construction of the rolls 10 form no part of the present invention, the construction shown in FIG. 1 merely being illustrative of the type of rolls forming the workpiece for the subject matter of the present invention.

Figure 3:
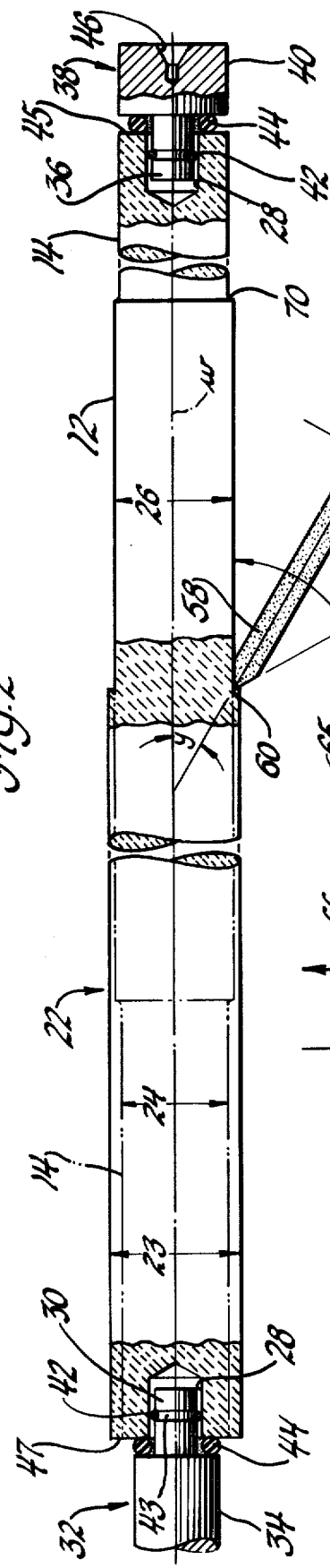
FIG. 3 is a plan view of apparatus according to the present invention with the workpiece installed thereon for the grinding operation.

With reference to FIG. 3, reference numeral 22 indicates the blank or workpiece from which the roll 12 is formed. The blank 22 is formed of fused silica, or glass rock, or similar ceramic material, and is formed to a blank diameter indicated by dimension 23 in FIG. 3. It is thus necessary to grind the blank 22 to the configuration of the roll 12 illustrated in FIG. 1. It is thus necessary to grind the end portions 14 from the blank diameter 23 to the finish diameter 24, and the central portion of the roll 12 from the blank diameter 23 to a finish diameter 26. In accordance with the present invention, an apparatus and method is provided for removing the excess stock from the blank diameter 23 to the finish diameters 24 and 26 by imposing a minimum amount of transverse forces on the elongated workpiece to minimize or substantially eliminate warpage or other distortion of the workpiece.

As shown in FIG. 3, the workpiece 22 is formed at each end with an axial bore or opening 28. The bore 28 at the left end of the workpiece 22, as viewed in FIG. 3, receives the shank 30 of a support and drive member 32 having a head portion 34. The bore 28 at the right-hand end of the workpiece 22, as viewed in FIG. 3, receives the shank 36 of a support member 38 having a head portion 40. Shanks 30 and 36 are telescopically engaged with the respective ends of the workpiece, and in the illustrated embodiment are supported within the respective bores 28 by centering O-rings 42. The centering O-rings 42 are received in grooves 43 in the respective shanks 30 and 36 to locate and restrain the O-rings 42 longitudinally on the shanks. The centering O-rings 42 are illustrated as being of elastomeric material; however, it is apparent that they may be of nonelastomeric material.

Elastomeric drive o-rings 44 are concentrically mounted on the shanks 30 and 36 and are disposed between the head portions 34 and 40 and the respective end surfaces 45 and 47 of the workpiece 22 surrounding the openings 28. The support and drive member 32 has an elongated head portion 34 for engagement by a drive chuck (not shown). The support member 38 is formed with a recess 46 for receiving a lathe center (not shown) so that, in the illustrated embodiment of FIG. 3, the left end of the workpiece 22 is driven by a chuck engaging the head portion 34 of the support member 32, and the right-hand end is supported on a lathe center by the support member 38. Thus the support member 38 may be referred to as a nondriving support member. The drive is transmitted to the workpiece 22 frictionally through the O-rings 44 which are compressed between the head portion 34 and 40 and the adjacent end surfaces of the workpiece 22. The frictional drive provided by the O-rings 44 prevents any bending or distortion of the elongated workpiece 22.

In the apparatus shown in FIG. 3, rotatably grinding means is supported for movement in a path parallel to the axis of rotation of the workpiece. The grinding means in FIG. 3 is in the form of a single grinding wheel 48.

Figure 4:
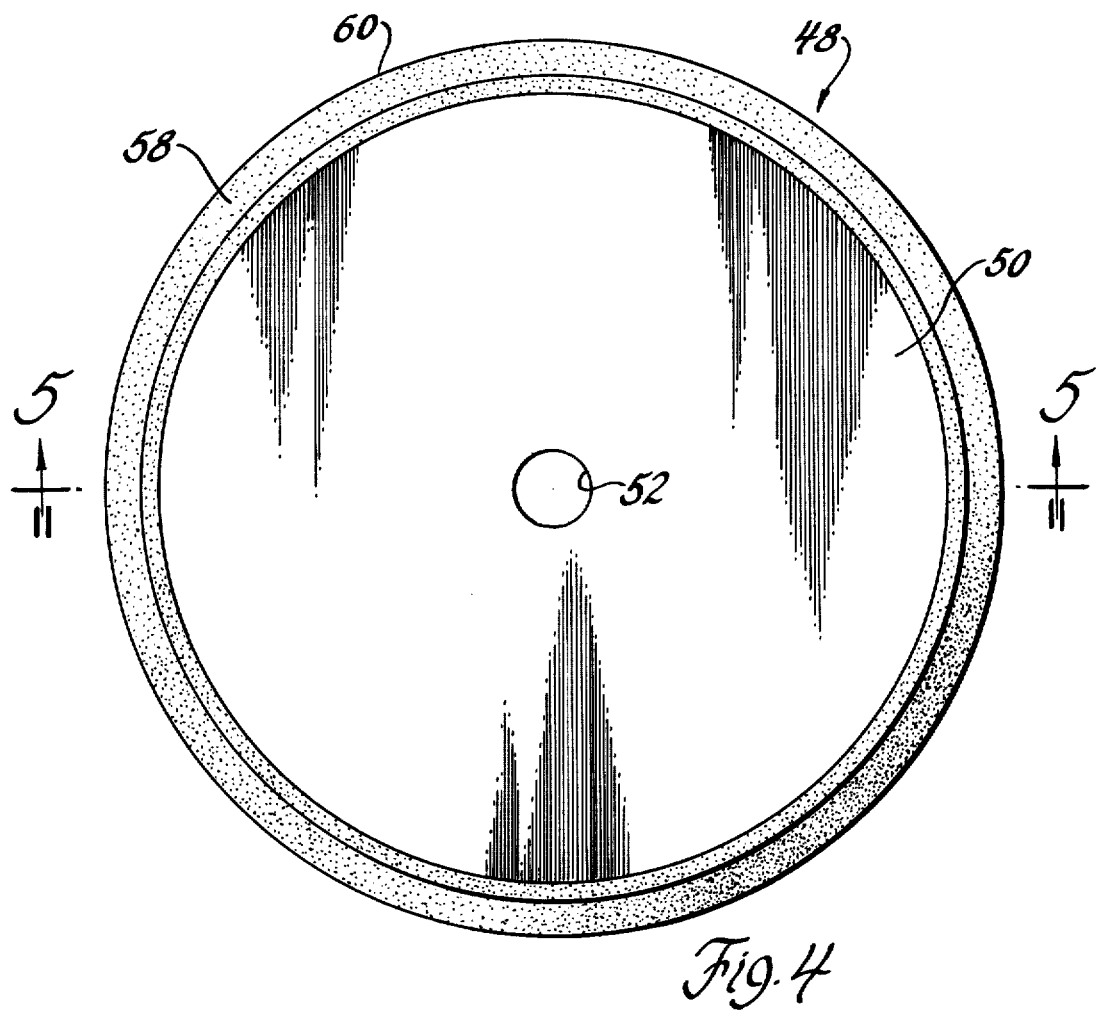
FIG. 4 is a plan view of a grinding wheel according to the present invention.
Figure 5:
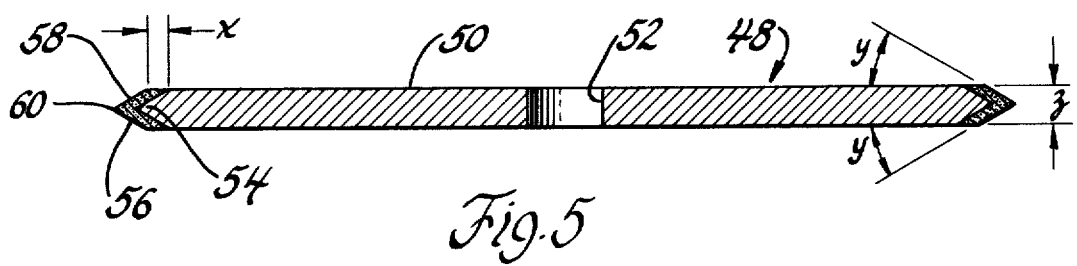
FIG. 5 is a sectional view taken on lines 5—5 of FIG. 4.

FIGS. 4 and 5 illustrate the grinding wheel 48 for grinding the workpiece 22 to the finished diameters 24 and 26 as the workpiece 22 is rotated by the support members 32 and 38 about an axis of rotation common to the support members 32 and 38. The grinding wheel 48 is in the form of circular disc 50 having a central 52 for nonrotatable connection with a spindle. The disc 50 is formed with a peripheral edge 54 that is V-shaped in cross section. A complementary shaped layer of abrasive material, such as a diamond matrix, is mounted on the periphery of the grinding wheel to define a V-shaped peripheral grinding edge having two grinding surfaces 56 and 58 extending from the apex 60 at an acute angle $y$ with respect to the plane of the disc 50. The grinding surfaces 56 and 58, also extend from the apex 60 at an acute angle with respect to each other. In the illustrated embodiment, the angles $y$ are each 30° so that the included angle between the grinding surfaces 56 and 58 is 60°. The abrasive material has a thickness $x$ which, in the illustrated embodiment may be on the order of ⅛ inch. The thickness $z$ of the disc 50 is on the order of 1/74 inch.

Again referring to FIG. 3, the grinding wheel 48 is mounted on a spindle for rotation about an axis 62 with the grinding wheel 48 lying in a plane disposed at acute angle with respect to the axis of rotation of the workpiece 22, the acute angle being preferably equal to the angle of the grinding surfaces 56 and 58 with respect to the plane of the grinding disc 50. The grinding surface 56 constitutes a rough-cutting grinding surface and surface 58 constitutes a finish-cutting grinding surface. The grinding wheel 48 is disposed at an cute angle $y$ with respect to the axis of rotation $w$ of the workpiece 22. Consequently, the grinding surface 58 of the grinding edge of the disc 50 is disposed in parallel relationship with the axis of rotation $w$ of the workpiece 22, and the grinding surface 56 is disposed at an angle $2y$ with respect to the axis of rotation of the workpiece 22. Therefore, since the angle $2y$ is an acute angle with respect to the axis of rotation of the workpiece 22, the grinding surface 56 is disposed in an undercut relationship with respect to the stock to be removed between the blank diameter 23 and the finish diameters 26 and 24.

FIG. 3 illustrates the grinding wheel 48 disposed to grind the central portion of the workpiece 22 to the finish diameter 26 from the blank diameter 23. The apex 60 of the grinding edge is disposed at the finish diameter 26 and the grinding wheel, in addition to rotation about its axis 62, is fed toward the left in the direction of arrow 65 so that the grinding surface 56 removes the stock with an undercut so that the transverse forces on the workpiece 22 are substantially counterbalanced, that is to say, the forces in the direction of arrow 66 are reacted by the component of force between the grinding surface 56 and the undercut surface in the opposite direction, or in the direction of arrow 68 such that there are substantially no net transverse forces imposed on the workpiece 22 by the grinding wheel. As the apex 60 moves toward the left in the direction of arrow 65 in FIG. 3, the grinding surface 56 removes the stock from the blank diameter 23 to a rough diameter and the grinding surface 58 trails the apex 60 and performs a finish grinding operation to remove stock from the rough diameter to the finish diameter 12. The undercut relationship between the grinding surface 56 and the stock being removed imparts a force in the direction of arrow 68 in FIG. 3 tending to pull the surface of the roll 12 against the grinding surface 58 to smooth and finish grind the roll to the finish diameter 26. The force of the grinding wheel on the workpiece is thus substantially parallel to the axis of rotation $w$ to minimize transverse bending forces on the workpiece in the direction of arrow 66.

It has been found in tests of the invention, that with the angle $y$ of 30° and the angle $2y$ in FIG. 3 of 60°, the grinding force is substantially parallel to the axis of rotation 21 of the workpiece 22 so that there are substantially no forces tending to spring or warp the workpiece. Warps of ⅛ inch in the workpiece can be removed from a 1.25 inch diameter roll 46 inches long in one pass reducing the warp, or run-out as measured by a dial gauge to plus or minus 0.001 inches. At high cutting rates, the run-out may be plus or minus 0.010 inches and this can be reduced substantially to the vanishing point by a second pass of the grinding wheel. The undercutting action of the frusto-conical grinding surface 56 tends to pull the workpiece into the side of the grinding surface 58 for a smooth finishing effect.

With the drive provided by the O-rings 44, all of the cylindrical surface can be exposed for grinding from end to end without remounting to assure the utmost accuracy. Also, a substantially perfectly concentric step at the shoulder 70 can be ground on each end to receive the metal caps or sleeves 16.

In the embodiment of FIG. 6, the rotatable grinding means comprises two grinding wheels 100 and 101 located diametrically opposite each other with respect to the longitudinal axis $w$ of the workpiece 22. Both of the grinding wheels 100 and 101 are supported for movement in the direction of arrows 65 in a path parallel to the axis of rotation $w$ of the workpiece. The grinding wheel 102 performs a rough-cutting operation to remove stock from the blank diameter 23 of the workpiece 22 to a rough diameter 25, while the grinding wheel 101 performs a smoothing operation and removes stock from the rough diameter 25 to the finish diameter 26, the central portion only of the workpiece 22 being illustrated in FIG. 6.

The grinding wheel 100 includes a hub portion 102 and a radially extending rim having a peripheral grinding edge 104 with two grinding surfaces 106 and 108 extending radially inwardly therefrom on opposite sides of the grinding edge 104. The grinding wheel 100 is mounted on a spindle for rotation about an axis 110 with the grinding wheel surfaces 106 and 108 lying in a plane disposed at an acute angle with respect to the axis $w$.

The rim of the grinding wheel 100 defining the grinding edge 104 is thin compared to the amount of stock to be removed between the blank diameter 23 and the rough diameter 25 so that it is in a undercutting relationship with the workpiece both at the central portion having the finish diameter 26 and at the ends having the finish diameter 24 (FIG. 3). The grinding edge 104 exerts substantially axial forces only in a direction parallel to the axis $w$ as it moves in the direction of arrows 65 along the length of the workpiece 22.

The finish grinding wheel 101 includes a hub portion 114, a flange 116 projecting radially from the hub 114, and a grinding face 118 on the outer surface of the flange 116. The grinding face 118 comprises a layer of abrasive material, such as a diamond matrix. The grinding face 118 includes a peripheral inclined portion 120 for engaging the workpiece. The grinding wheel 101 is mounted on a spindle for rotation about an axis 122. The angle of the axis 122 with respect to the axis $w$ is such that the inclined portion 120 of the grinding surface is disposed in substantially parallel relationship with the axis $w$. The surfaces 118 and 120 constitute the finish-cutting surface of the grinding means.

The grinding wheel 101 is located with respect to the grinding wheel 100 such that the outer periphery of surface 120 engages the workpiece 22 at a location slightly trailing the point of contact between the grinding wheel 100 and the workpiece 22. As a consequence, there are substantially no radial forces imposed on the workpiece 22 by the grinding wheels 100 and 101. The angular relationship of the grinding wheel 100 is such that the grinding wheel 100 imposes axial forces only on the workpiece 22. With the grinding wheel 101 located diametrically opposite the grinding wheel 100 and trailing it slightly, the grinding wheel 100 counterbalances any radial forces imposed on the workpiece 22 by the grinding surface 120.

Since the grinding wheel 100 imposes substantially no radial forces on the workpiece 22 as it performs its rough-cutting operation, the smoothing operation, by the grinding wheel 101 may be performed on a separate pass with the workpiece 22 being supported along its length on rotating drive rolls instead of on centers at its ends. The smoothing operation can thus be performed in a separate, centerless grinding operation by the grinding wheel 101 after the straightness of the workpiece 22 has been established by the undercutting rough grinding operation of the grinding wheel 100. The centerless mounting of the roll on the rotating drive rolls will provide adequate support for the rough ground roll to prevent bending or distorting of the workpiece 22 during this smoothing operation. The centerless support of the workpiece 22 on its full length on rotating drive rolls will provide adequate radial support to counterbalance any radial forces imposed by the finish-grinding wheel 101.

In the embodiment of FIG. 6, the radial components of grinding force of the two wheels 100 and 101 cancel each other. Any residual radial force from the rough grinding wheel 100, if not cancelled, will cause the workpiece to deflect away from the wheel 100 more at the center than at the ends-which would result in the workpiece becoming barrel shaped, or larger in the center than at the ends. The amount of stock removal by the finish wheel 101, and hence the radial force exerted by the finish wheel, may be set to just cancel the residual radial force of the wheel 100. With the arrangement of FIG. 6, the diameter of a 1¼ inch diameter, 46 inch long roll 22 will be constant to ±0.001 inch.

While specific embodiments of the invention have been illustrated in the accompanying drawings and described in the foregoing specification, it should be understood that the invention is not limited to the exact construction shown. To the contrary, alterations in the construction and arrangement of parts, all falling within the scope and spirit of the invention, will be apparent to those skilled in the art.

The embodiments of the present invention in which an exclusive property or privilege is claimed are defined as follows:

1. Apparatus for grinding a workpiece in the form of an elongated cylindrical roll from a rough diameter to a finish diameter comprising: support means for rotatably supporting the workpiece; and rotatable grinding means supported for movement in a path parallel to the axis of rotation of the workpiece, said grinding means including a rough-cutting grinding surface engageable with the workpiece in an undercutting relationship said grinding means being operable at least during the rough cutting operation to impose forces on the workpiece in a substantially axial direction only.

2. Apparatus as claimed in claim 1 wherein said grinding means further includes a finish-cutting grinding surface trailing the rough-cutting grinding surface and operable to finish cut the workpiece to its finish diameter.

3. Apparatus as claimed in claim 2 wherein said grinding means includes a grinding wheel having a peripheral grinding edge with two grinding surfaces extending radially inwardly therefrom on opposite sides thereof; said grinding wheel being disposed in a plane at an acute angle with respect to the axis of rotation of the workpiece with the peripheral edge located radially inwardly of the rough diameter of the workpiece with respect to the axis of rotation.

4. Apparatus as claimed in claim 2 wherein said grinding means further includes a finish grinding wheel having said finish-cutting grinding surface located thereon, said finish grinding wheel being disposed in a plane at an acute angle with respect to the axis of rotation of the workpiece and on the diametrically opposite side of said axis of rotation from said first named grinding wheel, said finish-cutting grinding surface being located with respect to the axis of rotation of the workpiece at the finish diameter of the workpiece.

5. Apparatus as claimed in claim 3 wherein one of said grinding surfaces on the side of said peripheral edge opposite the axis of rotation of the workpiece constitutes the rough-cutting grinding surface and the other of said grinding surfaces constitutes the finish-cutting grinding surface.

6. Apparatus as claimed in claim 5 wherein said peripheral grinding edge is substantially V-shaped, and said finish cutting grinding surface extends from the apex in substantially parallel relationship with the axis of rotation of the workpiece.

7. Apparatus as claimed in claim 1 wherein said support means comprises: a support and drive member having a head portion adapted to be engaged by a rotatable drive chuck and means for supporting and frictionally rotatably driving one end of a workpiece.

8. Apparatus as claimed in claim 7 wherein said support and drive member further includes a shank portion extending axially from said head portion for telescopic engagement with a workpiece.

9. Apparatus as claimed in claim 8 wherein said shank portion is cylindrical and of smaller diameter than said head portion, and further including a drive O-ring mounted on said shank for frictional engagement between the head portion and the end surface of the workpiece supported thereby for frictionally rotating the workpiece.

10. Apparatus as claimed in claim 9 further including a centering O-ring mounted in said shank portion at a location spaced from said head portion.

11. Apparatus as claimed in claim 10 further including a groove in said shank portion, said centering O-ring being seated in said groove and projecting outwardly from the shank portion.

12. Apparatus as claimed in claim 8 further including a centering O-ring mounted in said shank portion at a location spaced from said head portion.

13. Apparatus as claimed in claim 12 further including a groove in said shank portion, said centering O-ring being seated in said groove and projecting outwardly from the shank portion.

14. Apparatus as claimed in claim 7 wherein said support means comprises a nondriving support member spaced axially from said support and drive member in coaxial relationship therewith for supporting the end of a workpiece opposite the end to be supported by said support and drive member, said nondriving support member having a head portion adapted to be rotatably supported on a lathe center.

15. Apparatus as claimed in claim 14 wherein said nondriving support member further includes a shank portion extending axially from the head portion thereof for telescopic engagement with a workpiece.

16. Apparatus as claimed in claim 15 wherein said shank portion of said nondriving support member is cylindrical and of smaller diameter than said head portion, and further including a drive O-ring mounted on said shank for frictional engagement between the head portion thereof and the end surface of the workpiece supported thereby so that the frictional engagement causes the workpiece and nondriving support member to rotate together.

17. Apparatus as claimed in claim 16 further including a centering O-ring mounted on the shank of said nondriving support member at a location spaced from the head portion thereof.

18. Apparatus as claimed in claim 17 further including a groove on the shank portion of said nondriving support member, said centering O-ring being seated in said groove and projecting outwardly from said shank portion.

19. Apparatus as claimed in claim 15 further including a center O-ring mounted on the shank of said nondriving support member at a location spaced from the head portion thereof.

20. Apparatus as claimed in claim 19 further including a groove on the shank portion of said nondriving support member, said centering O-ring being seated in said groove and projecting outwardly from said shank portion.

21. A method of grinding a workpiece in the form of an elongated cylindrical roll from a rough diameter to a finish diameter comprising the steps of: rotating the workpiece about its longitudinal axis; positioning a frusto-conical grinding surface with its large diameter edge at a location with respect to the rotary axis of the workpiece corresponding to the finish diameter of the workpiece such that the grinding surface extends at an acute angle with respect to the rotary axis of the workpiece; rotating the grinding surface about its central axis; and moving the grinding surface along the length of the workpiece to remove stock between the finish and rough diameters of the workpiece with an undercut to minimize the transverse forces on the workpiece tending toward the workpiece.

22. A method of grinding a workpiece in the form of an elongated cylindrical roll from a rough diameter to a finish diameter comprising the steps of: rotating the workpiece about its longitudinal axis; positioning a grinding wheel having a peripheral grinding edge with two grinding surfaces extending therefrom on opposite sides thereof in a location such that the grinding wheel is disposed in a plane at an acute angle with respect to the axis of rotation of the workpiece with the peripheral edge of the grinding wheel located radically inwardly of the rough diameter of the workpiece with respect to the axis of rotation; and simultaneously rotating the grinding wheel about its own central axis and moving the grinding wheel along the length of the rotating workpiece in a direction such that the peripheral edge of the grinding wheel removes stock from the workpiece with an undercut.

23. A method as claimed in claim 22 further comprising the steps of frictionally rotatably driving at least one end of the workpiece to reduce twisting forces on the workpiece.

24. Apparatus for grinding a workpiece in the form of an elongated cylindrical roll from a rough diameter to a finish diameter comprising: support means for rotatably supporting the workpiece, a rough-cutting grinding wheel supported for movement in a path parallel to the axis of rotation of the workpiece and operable to engage the workpiece in one side thereof with an undercut relationship, and a finish-cutting grinding wheel supported for movement in a path parallel to the axis of rotation of the workpiece and operable to engage the workpiece on the opposite side thereof from said rough-cutting grinding wheel, said finish-cutting grinding wheel being located to slightly trail said rough-cutting grinding wheel along the length of the workpiece, said grinding wheels being positioned with respect to the workpiece such that the finish-cutting grinding wheel removes an amount of stock to the finish diameter that cancels any radial forces imposed on the workpiece by the rough-cutting grinding wheel.

* * * * *